United States Patent
Vasseur et al.

(10) Patent No.: US 12,231,312 B2
(45) Date of Patent: Feb. 18, 2025

(54) AUTONOMOUS SYSTEM BOTTLENECK DETECTION

(71) Applicant: Cisco Technology, Inc., San Jose, CA (US)

(72) Inventors: Jean-Philippe Vasseur, Saint Martin d'Uriage (FR); Vinay Kumar Kolar, San Jose, CA (US); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 17/328,205

(22) Filed: May 24, 2021

(65) Prior Publication Data
US 2022/0376998 A1 Nov. 24, 2022

(51) Int. Cl.
| | |
|---|---|
| *H04L 43/045* | (2022.01) |
| *G06F 16/901* | (2019.01) |
| *H04L 43/08* | (2022.01) |
| *H04L 43/12* | (2022.01) |
| *H04L 69/326* | (2022.01) |

(52) U.S. Cl.
CPC .......... *H04L 43/08* (2013.01); *G06F 16/9024* (2019.01); *H04L 43/045* (2013.01); *H04L 43/12* (2013.01); *H04L 69/326* (2013.01)

(58) Field of Classification Search
CPC ....... H04L 43/08; H04L 43/045; H04L 43/12; H04L 69/326; G06F 16/9024
See application file for complete search history.

(56) References Cited

U.S. PATENT DOCUMENTS

| | | | |
|---|---|---|---|
| 7,269,157 | B2 | 9/2007 | Klinker et al. |
| 9,712,400 | B1* | 7/2017 | Gegout .............. H04L 12/4625 |
| 10,389,613 | B2 | 8/2019 | Dasgupta et al. |
| 10,637,767 | B2 | 4/2020 | Nauck et al. |
| 10,708,144 | B2 | 7/2020 | Mohan et al. |
| 10,764,120 | B1* | 9/2020 | Means .................. H04L 45/586 |
| 10,897,424 | B1* | 1/2021 | Dhanabalan ............ H04L 43/08 |
| 11,456,926 | B1* | 9/2022 | Mermoud ............ H04L 41/5067 |
| 12,074,789 | B1* | 8/2024 | Vasseur ................. H04L 45/123 |
| 2006/0165009 | A1* | 7/2006 | Nguyen ................ H04L 47/125 370/254 |

(Continued)

OTHER PUBLICATIONS

"Autonomous System (Internet)", online: https://en.wikipedia.org/wiki/Autonomous_system, Mar. 9, 2021, 3 pages, Wikimedia Foundation, Inc.

*Primary Examiner* — Dhairya A Patel
(74) *Attorney, Agent, or Firm* — BEHMKE INNOVATION GROUP LLC; James M. Behmke; Keith O. Mitchell

(57) ABSTRACT

In one embodiment, a supervisory service for a network obtains quality of experience metrics for application sessions of an online application. The supervisory service maps the application sessions to paths that traverse a plurality of autonomous systems. The supervisory service identifies, based in part on the quality of experience metrics, a particular autonomous system from the plurality of autonomous systems associated with a decreased quality of experience for the online application. The supervisory service causes application traffic for the online application to avoid the particular autonomous system.

18 Claims, 11 Drawing Sheets

(56) References Cited

U.S. PATENT DOCUMENTS

| | | | |
|---|---|---|---|
| 2014/0254423 A1* | 9/2014 | Beesabathina | H04L 45/02 370/254 |
| 2018/0044034 A1* | 2/2018 | Newman | B64D 43/00 |
| 2018/0359699 A1* | 12/2018 | Strong | H04L 45/00 |
| 2019/0102709 A1* | 4/2019 | Correa | G06Q 10/02 |
| 2019/0104052 A1* | 4/2019 | Cidon | H04L 43/0852 |
| 2019/0386912 A1 | 12/2019 | Huang et al. | |
| 2020/0153701 A1* | 5/2020 | Mohan | H04L 41/5009 |
| 2020/0296012 A1* | 9/2020 | Paruchuri | H04L 41/5009 |
| 2021/0044530 A1* | 2/2021 | Dhanabalan | H04L 41/0894 |
| 2021/0058319 A1* | 2/2021 | Chu | H04L 43/0852 |
| 2022/0029906 A1* | 1/2022 | Mahesh | H04L 41/14 |

* cited by examiner

AUTONOMOUS SYSTEM BOTTLENECK DETECTION

TECHNICAL FIELD

The present disclosure relates generally to computer networks, and, more particularly, to autonomous system (AS) bottleneck detection.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.). SD-WANs are often used to convey application traffic for various software-as-a-service (SaaS) applications. Under such a model, an application is hosted online (e.g., in the cloud) and is accessed by web browser or dedicated client application executed by the device of an end user.

Typically, end-to-end path metrics are used to made routing decision with respect to SaaS application traffic. However, this is done automatically by the network and without regard to the application itself or to the client endpoints that access the application. Indeed, the entire path is often not seen at the ends of the traffic flow. Hence, the network routing systems do not attempt to identify any bottlenecks/hotspots along a path, such as those associated with a particular autonomous system. This limits the ability of the routing systems to explore and utilize many paths that exclude only the hotspots.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
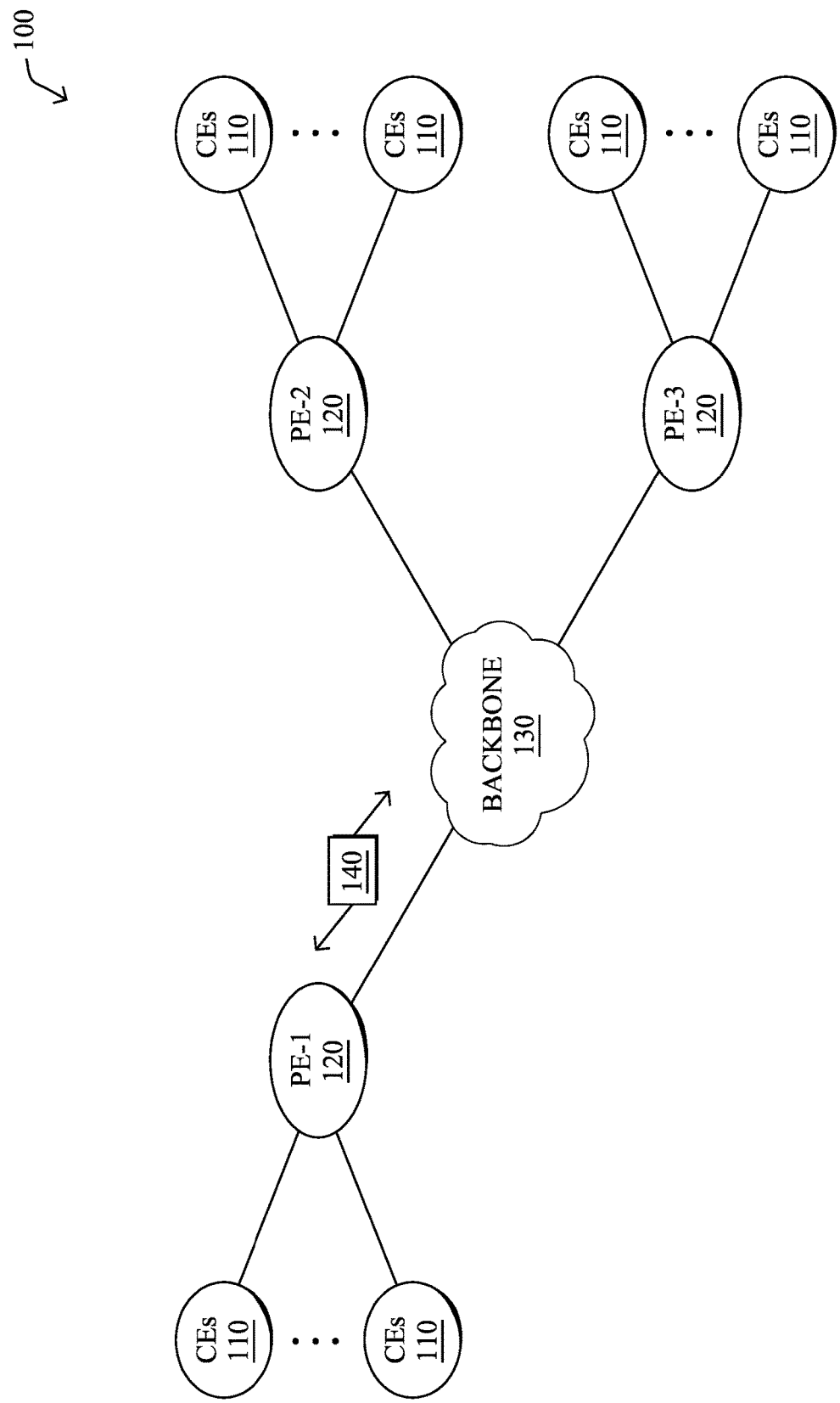
FIGS. 1A-1B illustrate an example communication network.

According to one or more embodiments of the disclosure, a supervisory service for a network obtains quality of experience metrics for application sessions of an online application. The supervisory service maps the application sessions to paths that traverse a plurality of autonomous systems. The supervisory service identifies, based in part on the quality of experience metrics, a particular autonomous system from the plurality of autonomous systems associated with a decreased quality of experience for the online application. The supervisory service causes application traffic for the online application to avoid the particular autonomous system.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
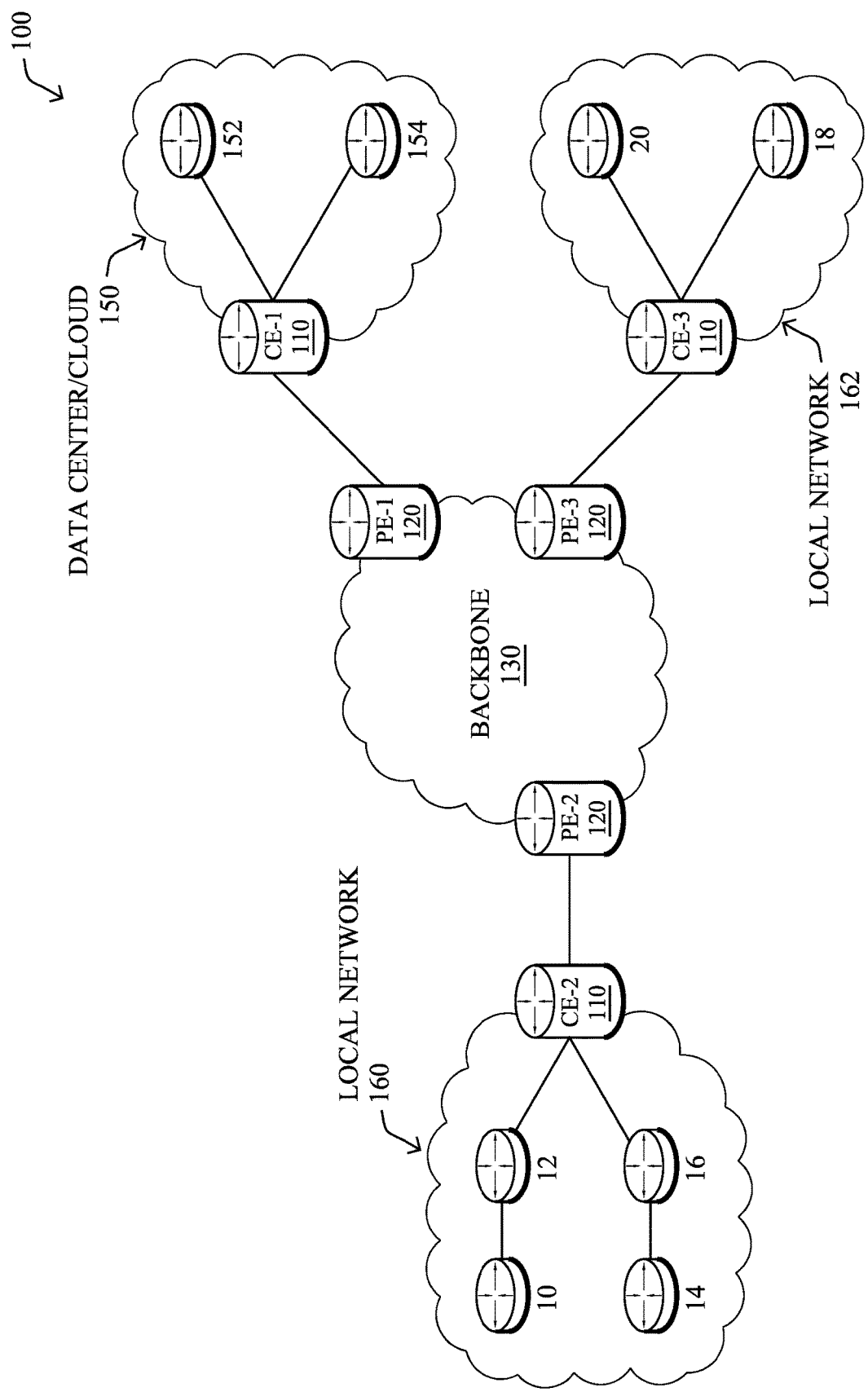

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
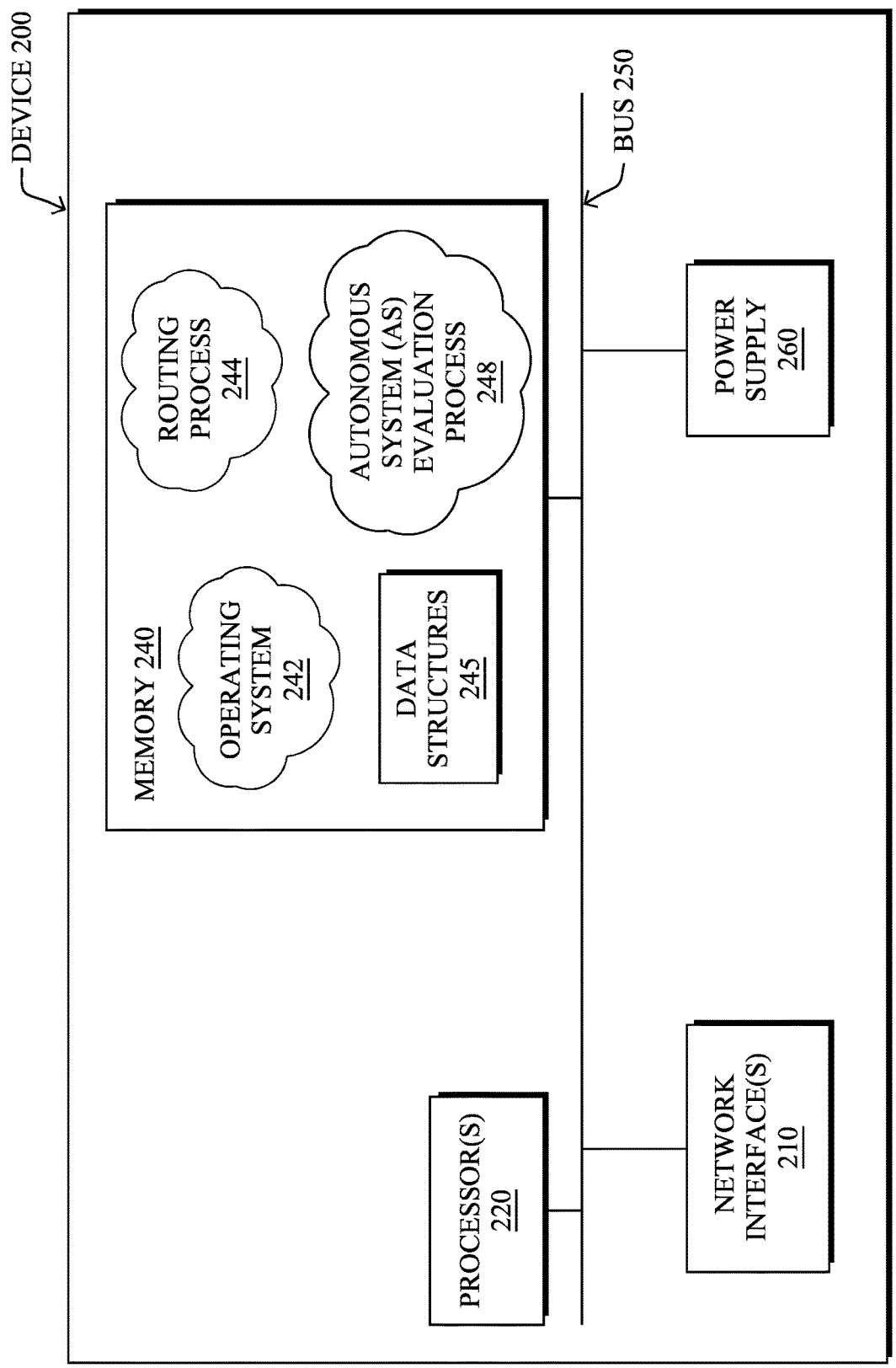
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or an autonomous system (AS) evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or AS evaluation process 248 may also include computer executable instructions that, when executed by processor(s) 220, cause device 200 to perform the techniques described herein. To do so, in some embodiments, routing process 244 and/or AS evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or AS evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or AS evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
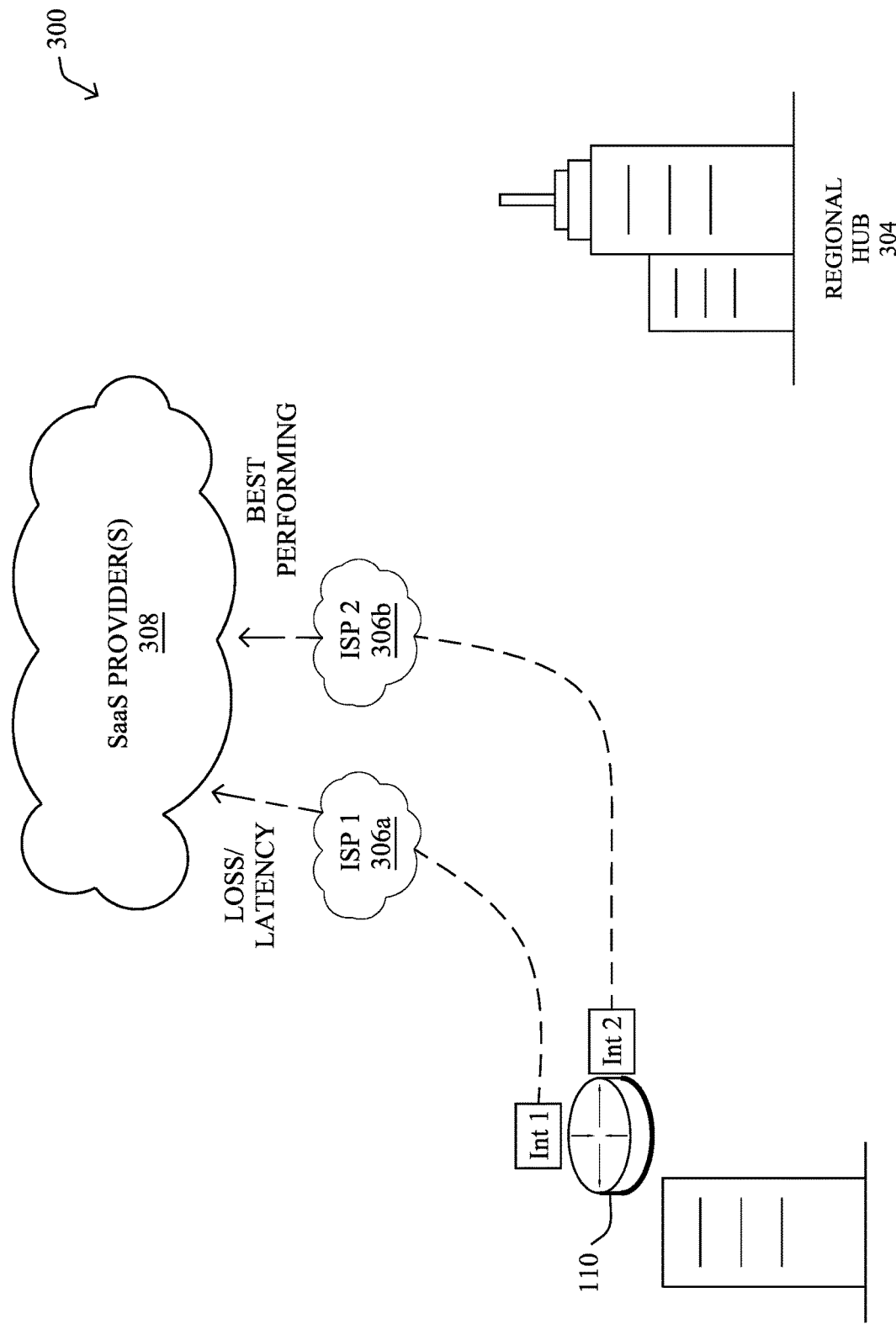
FIGS. 3A-3B illustrate example network deployments.
Figure 3B:
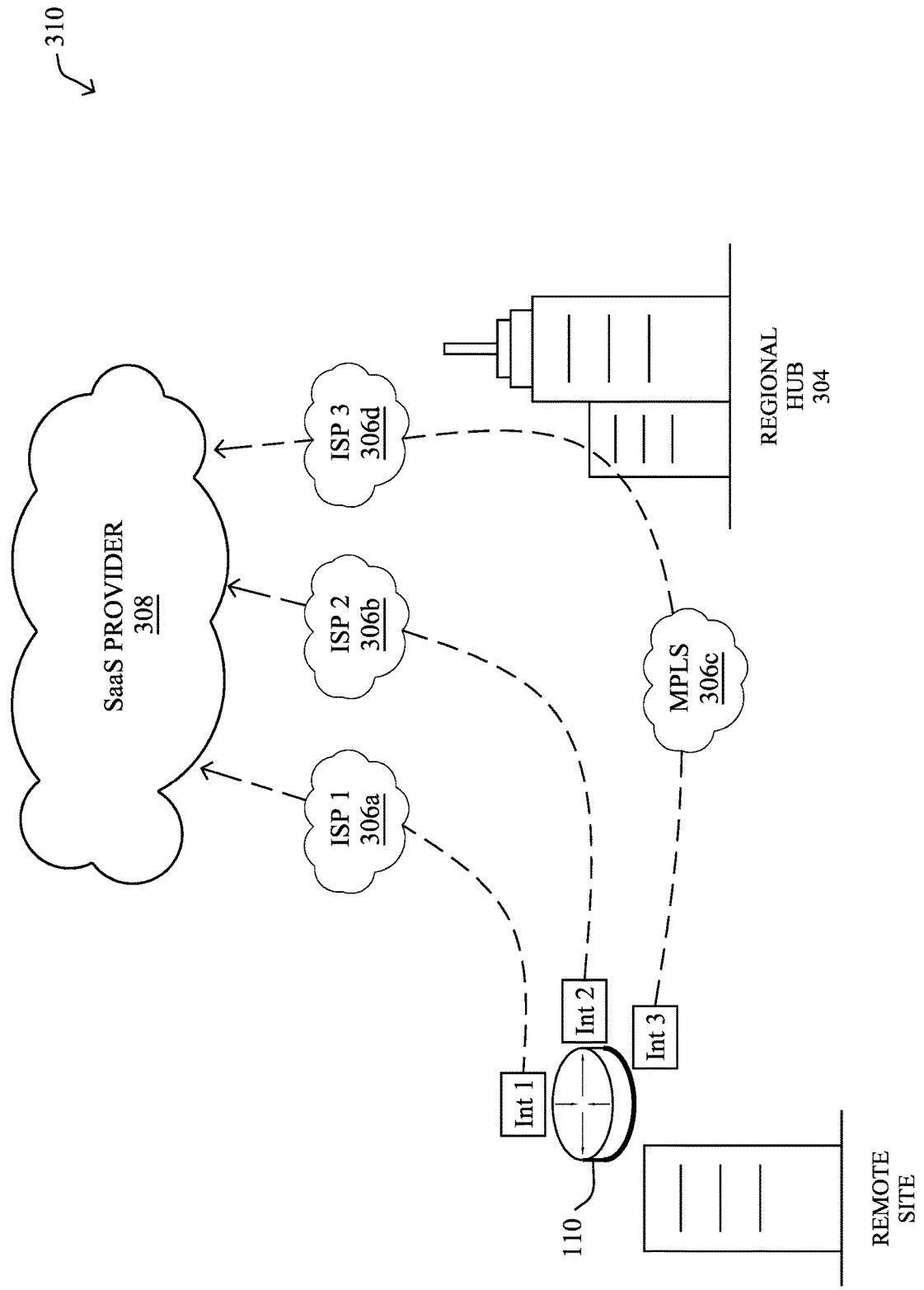

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
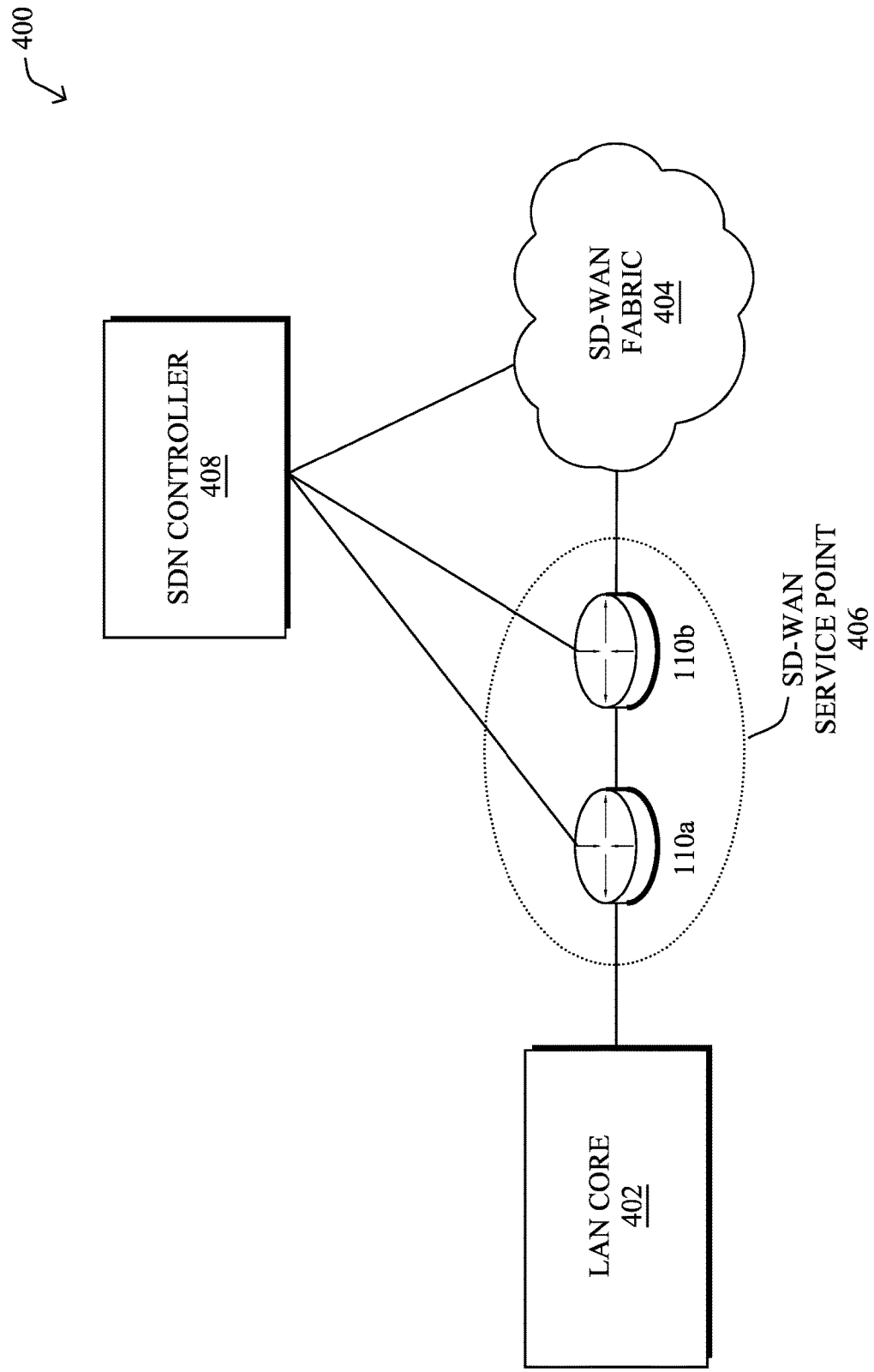
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region. SP, access type, as well as over time with high granularity. The immediate consequence is that the environment is highly dynamic due to:
  New in-house applications being deployed;
  New SaaS applications being deployed everywhere in the network, hosted by a number of different cloud providers;
  Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
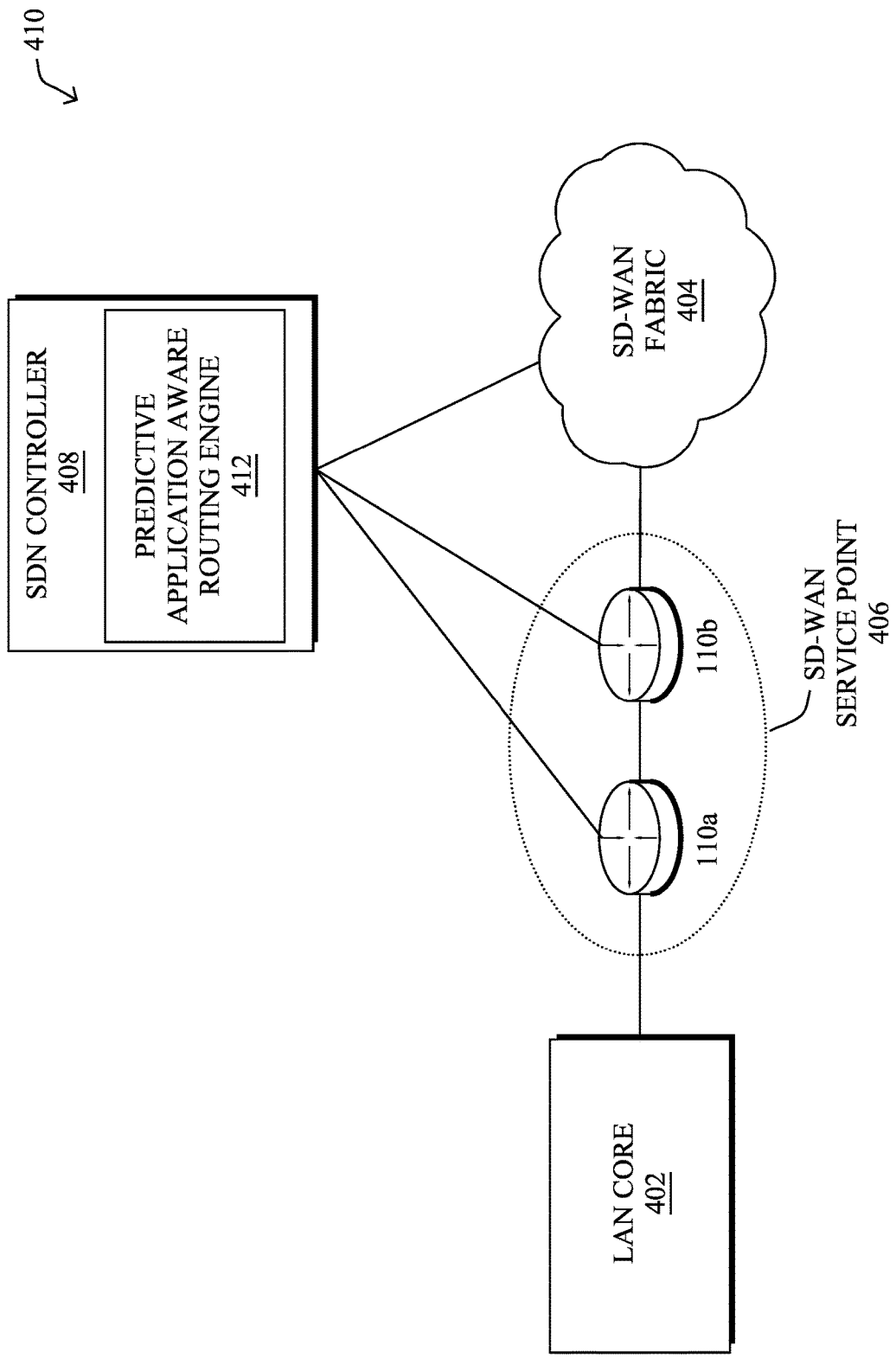

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or AS evaluation process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, an application-aware routing engine, such as predictive application aware routing engine 412, may collect user experience metrics (e.g., QoE metrics) regarding an online application. In addition to QoE, it may also utilize traditional network metrics obtained via probes for each user session. The engine then routes the application traffic via paths expected to provide better user experience.

As would be appreciated, Internet paths travel through client device, edge routers, various autonomous systems, and finally to the application server. In many routing systems, the end-to-end path metrics, such as NetFlow and HTTP probes, are used for routing. The entire path is often not seen at the client or application ends and, hence, the routing systems do not attempt to infer where the exact hotspot is in the path. This limits the ability to explore and utilize many paths that exclude only the hotspots.

—Autonomous System Bottleneck Detection—

The techniques introduced herein allow for the identification of autonomous systems that act as bottlenecks for an online application. In some aspects, this can be achieved by obtaining hop-level information (e.g., traceroute), fusing the hop-level information with network and application experience data, to identify any 'hotspot' s autonomous systems that cause application experience degradation. In further aspects, the techniques herein can also be used to predict bottlenecks and other path disruptions, as well as routing application traffic over alternative routes that are likely to provide better user experience by avoiding a hotspot autonomous system.

Illustratively, the techniques described herein may be performed by hardware, software, and/or firmware, such as in accordance with AS evaluation process 248, which may include computer executable instructions executed by the processor 220 (or independent processor of interfaces 210) to perform functions relating to the techniques described herein (e.g., in conjunction with routing process 244).

Specifically, according to various embodiments, a supervisory service for a network obtains quality of experience metrics for application sessions of an online application. The supervisory service maps the application sessions to paths that traverse a plurality of autonomous systems. The supervisory service identifies, based in part on the quality of experience metrics, a particular autonomous system from the plurality of autonomous systems associated with a decreased quality of experience for the online application. The supervisory service causes application traffic for the online application to avoid the particular autonomous system.

Figure 5:
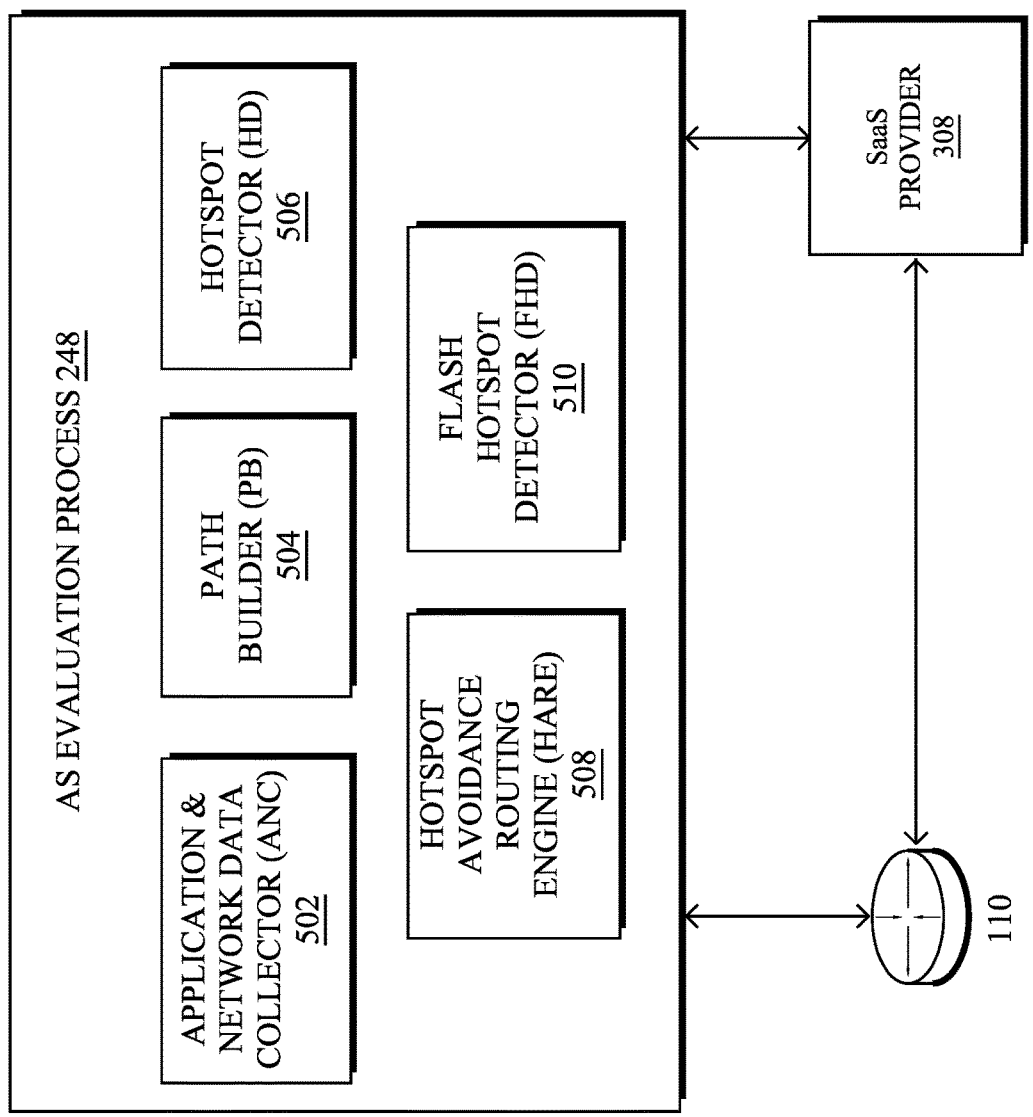
FIG. 5 illustrates an example architecture for detecting an autonomous system bottleneck.

Operationally, FIG. 5 illustrates an example architecture 500 for detecting an autonomous system bottleneck, according to various embodiments. At the core of architecture 500 is AS evaluation process 248, which may be executed by a controller for a network or another device in communication therewith. For instance, AS evaluation process 248 may be executed by a controller for a network (e.g., SDN controller 408 in FIGS. 4A-4B), a particular networking device in the network (e.g., a router, etc.), another device or service in communication therewith, or the like, to provide a supervisory service to the network.

As shown, AS evaluation process 248 may include any or all of the following components: an application and network data collector (ANC) 502, a path builder (PB) 504, a hotspot detector (HD) 506, a hotspot avoidance routing engine (HARE) 508, and/or a flash hotspot detector (FHD) 510. As would be appreciated, the functionalities of these components may be combined or omitted, as desired. In addition, these components may be implemented on a singular device or in a distributed manner, in which case the combination of executing devices can be viewed as their own singular device for purposes of executing AS evaluation process 248 and operating as the supervisory service for the network.

During execution, application and network data collector (ANC) 502 may be operable to obtain any or all of the following information:

Application experience data regarding the online application—In general, this data may be specified by users of the online application regarding their subjective experiences with the application (e.g., on a scale of 0-5 stars, etc.). Accordingly, ANC 502 may obtain such quality of experience metrics from SaaS provider 308 (e.g., if the metrics are captured in-application), from agents deployed to the endpoint clients of the application, or via another polling mechanism (e.g., direct polling of the users, such as via email, SMS text, etc.).

Netflow or IPFIX data for the user sessions of the application.

Path trace data from the various routers to popular SaaS destinations. For instance, such path trace data may indicate the various hops, autonomous systems, and the like, that are between router 110 and SaaS provider 308.

To obtain the above information. ANC 502 may also install path-trace monitoring utilities in the router(s) along the path or to devices in communication therewith. Such path-trace monitoring utilities may take various forms, such as traceroute utilities, mechanisms that capture the Border Gateway Protocol (BGP) routing tables from autonomous systems, or the like. For instance, such a utility may cause router 110 to periodically send probes to popular SaaS applications, and lists the network metrics on multiple hops of the paths between the router and one or more SaaS applications. In some instances, the path-trace monitoring utility may periodically send probes to SaaS destinations with varying Time-To-Live (TTL). This enables notifying ANC 502 of all of the autonomous systems seen publicly while going from router 110 to SaaS provider 308. The (un)reachability, delay, and loss can also be measured in this manner and reported back to ANC 502. In other embodiments, data from other path-trace data sources (e.g., ThousandEyes or RIPE data) may be ingested by ANC 502.

In various embodiments, path builder (PB) 504 is responsible for mapping each user session data to one or more probable path traversed by the application. This can be done by fusing the NetFlow or other telemetry data with the path-trace data and reconstructing the mapping of user session flows routed onto various set of autonomous systems.

In various embodiments, for each user-session (flow) detected in the NetFlow records, PB 504 may construct a path graph, which is a collection of all unique paths from the given edge-router-interface, such as an interface of router 110, to a destination SaaS-server (e.g., SaaS provider 308) in the time-period of the flow. PB 504 may construct such a path graph for any or all users sessions of the online application.

Figure 6:
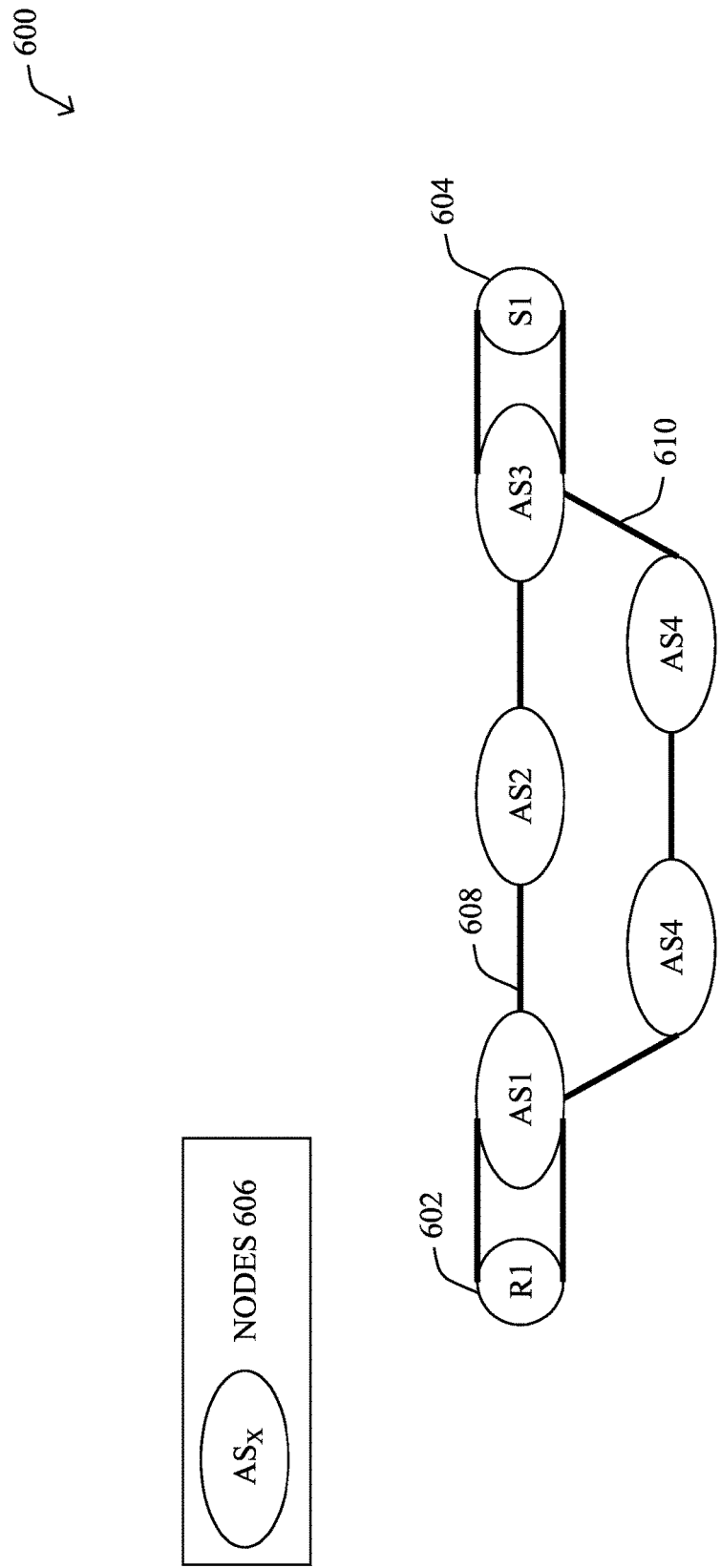
FIG. 6 illustrates an example path graph for an online application.

For instance. FIG. 6 illustrates an example of a path graph 600 between an edge router interface R1, represented as node 602 in path graph 600, and SaaS server S1, represented as node 604. In between node 602 and node 604 may be any number of nodes 606 that represent a plurality of autonomous systems, denoted $AS_x$ in FIG. 6. Thus, as shown, R1 may communicate with S1 via a first path 608 and a second path 610 that traverse different subsets of the autonomous systems represented in path graph 600.

Referring again to FIG. 5, another function of PB 504 may be to associate the quality of experience metrics for the application to the various edges and paths of the path graphs. As would be appreciated, there might be scenarios where application experience metrics are not available for a particular flow, but for a set of flows (e.g., all flows from R1 to S1 between a given time-period). In such cases. PB 504 may map the obtained application quality of experience metrics to all flows and corresponding path graphs. Periodically (say, for every 1 hour), PB 504 may output the identified autonomous systems, associated number of flows, and experience quality metrics, such as a set of data: <timestamp, AS, num-flows, user-experience distribution>.

In other embodiments. PB 504 may map user-specified quality of experience metrics for the application to paths between autonomous systems. To do so, PB 504 may aggregate, for each edge $AS_i$-$AS_j$, the quality of experience metrics for the application over a time-period (say, 1 hour). This can be done by keeping a record of the number of user sessions and the distribution of the user-experience score that has been seen for across all path graphs.

The output of PB 504, thus, may be what is referred to herein as a 'hotspot' graph. In this type of graph, each autonomous system is represented as a node and edges of the graph interconnect the autonomous systems, edge muter(s), and the SaaS server(s). Each edge in this type of graph may also be associated with the number of flows for the application and a measure of the quality of experience for those flows. For instance, each edge of a hotspot graph may be weighted based on the distribution of the quality of experience metrics associated with the flows that traverse that edge. Note that this type of graph is time-varying, and hotspots may appear and disappear over the edges.

In various embodiments, hotspot detector (HD) 506 is responsible for utilizing the hotspot information created by PB 504 and detect or predict the hotspot AS over time. In one embodiment where PB 504 outputs <timestamp, autonomous system, number of flows, score-distribution>, HD 506 may use a threshold to distinguish autonomous systems as being hotspots or not. In other words, HD 506 may assess the outputs of PB 504 to identify which autonomous system(s) are bottlenecks that impede the quality of experience for users of the online application. For example, HD 506 may determine that an autonomous system $AS_i$ is a hotspot if there are at least n-number of flows observed in the last 1 hour and the $75^{th}$ percentile of user-experience score <3 (out of 5). As would be appreciated, the thresholds used by HD 506 to identify hotspots may vary, as desired, and configurable via parameters, in some embodiments.

Figure 7:
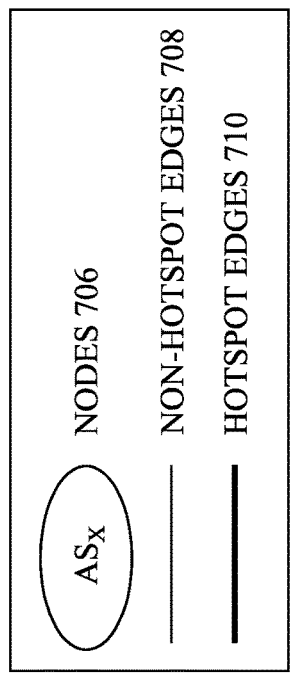
FIG. 7 illustrates an example of hotspots along different paths.
Figure 7:
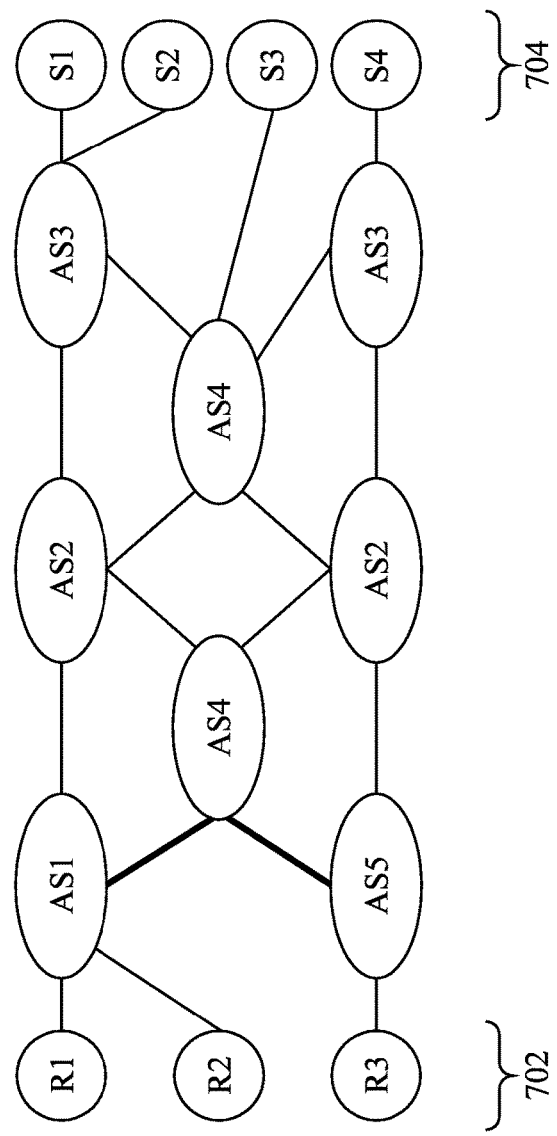

By way of example, FIG. 7 illustrates an example of hotspots along different paths, according to various embodiments. Similar to FIG. 6, FIG. 7 illustrates a path graph 700 whereby nodes 702 represent edge router interfaces R1-R3, nodes 704 represent SaaS servers S1-S4, and nodes 706 represent different autonomous systems. As shown, HD 506 may assess the attributes of the nodes and/or edges between these nodes in graph 700, to determine whether any represent a hotspot. For instance, the vast majority of edges between nodes 706 may be non-hotspot edges 708. However, HD 506 may also identify certain hotspot edges 710 connected to AS4, indicating that AS4 is a bottleneck/hotspot for the application during the time period under analysis.

Referring again to FIG. 5, in other embodiments. HD 506 may construct a regression or a time-series model for each autonomous system to forecast the user-experience for a certain time period. HD 506 may then tag an autonomous system based on the predicted user-experience score(s) associated with that autonomous system. Instead of a regression model, a classification model can also be used by first thresholding the user experience scores/quality of experience metrics, to identify hotspot, and then classifying an autonomous system as being a hotspot or not for the next time-period. Other features such as number of flows may also be used.

In embodiments where the edges of the path graph are flagged as being hotspots, an approach similar to above (thresholding, forecasting model) can be used by HD 506 to identify hotspot edges for the next time period. In yet another embodiment, the hotspot graph can be used to identify the hotspot autonomous system. This can be done by using various graph theory algorithms, such as computing the weighted degree for each autonomous system or leveraging a page-rank algorithm. For example, for every autonomous system, the average user-experience from all incoming edges may be computed by HD 506. An autonomous system is tagged as hotspot if the thus computed user-experience score/quality of experience metric is greater than a threshold. Similar to the above, a forecasting model can also be used.

The output of HD 506 can be the list of <AS, probability of hotspot> for the next few time-periods. In another embodiment, HD 506 can output subgraphs of the hotspot graph instead of individual nodes. In some cases, there might not be enough information to single out individual autonomous systems as being hotspots, but only that a full chain of a subgraph is a hotspot. In other words, HD 506 may identify a subset of autonomous systems that collectively impact the quality of experience of the application. This can be extracted by grouping neighboring nodes in the graph when they have similar metrics.

Another component of AS evaluation process 248 is hotspot avoidance muting engine (HARE) 508, which is responsible for using the forecasting from HD 506 and choose paths for incoming flows that avoid the autonomous system. To do so. ANC 502 may provide a list of paths seen from a particular edge router to every possible SaaS application server for the application. For example, in FIG. 6, ANC 502 may identify path 608 and path 610 between router R1 and server S1. Similarly, there might be another interface on the same edge-router to S. Or, there can also be routes from each interface $R_i$ of the router to different SaaS servers $S_j$ for the same application. Of all possible candidate routes to go from some router to some SaaS server for an application, HARE 508 may evaluate the user experience on all routes. This can be done by traversing the hotspot graph, such as the one shown in FIG. 7, on a per-path basis and checking whether there are any edges (or nodes) that are hotspots or have a high probability of hotspot. Note that the models in HD 506 can also forecast the hotspot score; these forecasts can be used for predicting which edges/nodes are hotspots.

HARE 508 may then rank the entire path based on the edge or the node with the lowest quality of experience score (or the highest probability for low user-experience score). HARE 508 may then rank these routes and select the best route for the application. In turn. HARE 508 may cause the application traffic to be scheduled on this path from the router and respective interface to the SaaS server of the path. For instance. HARE 508 may indicate the path to be used to the router(s) associated with the path(s) to be used and/or are currently in use. Note that there may be other embodiments, where the SaaS server may be fixed (e.g., based on the DNS resolution) or interface may be fixed (e.g., based on a security policy). Both of them can be implemented similarly by just selecting candidate paths that respect these constraints.

Another potential component of AS evaluation process 248 is flash hotspot detector (FHD) 510, which is responsible for detecting extreme hotspots that occur for a small period of time. In one embodiment, this can be detected by continuously monitoring the user experience scores/quality of experience metrics on the paths over a certain amount of time (e.g., once every minute, etc.). When there is a sudden spike of low user-experience scores for all sessions (e.g., from one router interface, or autonomous system of a service provider, or SaaS-server), then FHD 510 may send a new message to the path-trace modules to aggressively send path-trace probes on these source-destination pairs. A message is then sent to HD 506, to detect hotspots on these newly acquired routes, as well as to HARE 508, to propose the best routes. If any severe hotspot is detected, then the routing configuration is immediately pushed to reroute via best routes. The existing flows may also be stopped and redirected via the best routes.

Another potential function of AS evaluation process 248 is to allow for BGP to propagate a back-pressure signal through the Internet, thus allowing for downstream autonomous systems to receive notification and consequently act on such flag. To that end a custom BGP (optional and transitive) community is specified. The 32-bit flag field is used to reflect multiple level of congestion for set of known application since the back pressure mechanisms may be per application specific. If, for example, an autonomous system ASx determines that autonomous system ASy is a hotspot for application A1, the related flag field of the newly specified community is set. Downstream BGP peers may then process the community for best path selection.

Figure 8:
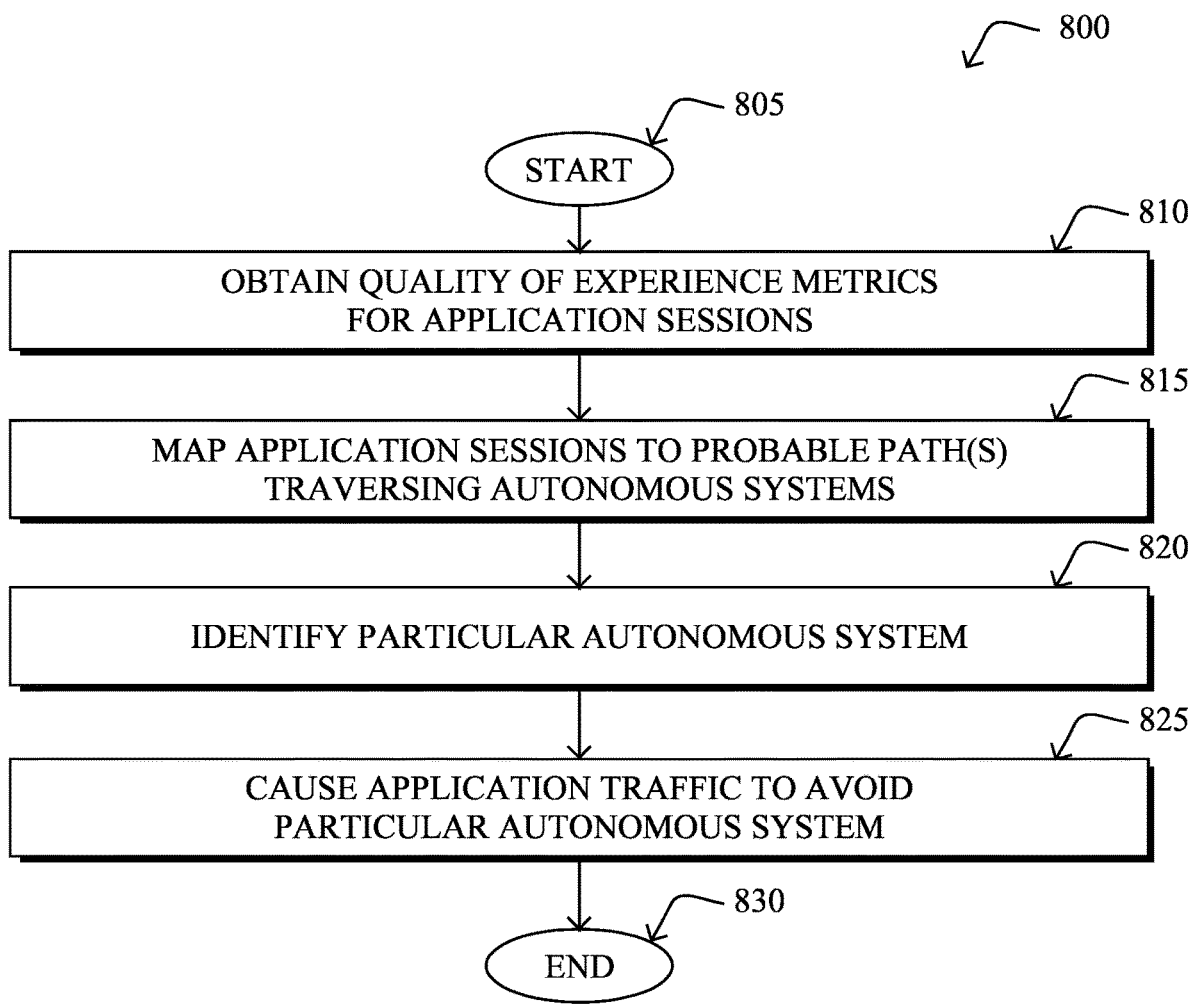
FIG. 8 illustrates an example simplified procedure for detecting autonomous system bottlenecks.

FIG. 8 illustrates an example simplified procedure 800 for detecting autonomous system bottlenecks, in accordance with one or more embodiments described herein. For example, a non-generic, specifically configured device (e.g., device 200), such as controller for a network (e.g., an SDN controller or other device in communication therewith), may perform procedure 800 by executing stored instructions (e.g., routing process 244 and/or AS evaluation process 248), as part of a supervisory service for a network. The procedure 800 may start at step 805, and continues to step 810, where, as described in greater detail above, the supervisory service may obtain quality of experience metrics for application sessions of an online application. For instance, the users of the application may specify the quality of experience metrics either directly within the application or using another polling mechanism, such as via an agent executed by their devices, sending direct message polls to the users (e.g., via email, SMS text, etc.).

At step 815, as detailed above, the supervisory service may map the application sessions to paths that traverse a plurality of autonomous systems. For instance, the service may obtain path network metrics, such as traceroute information (e.g., hop-by-hop information), BGP routing table information, probing information, or the like. In turn, the service may generate a graph having nodes that represent the plurality of autonomous systems and edges that represent path segments connecting the plurality of autonomous systems. In such a case, the service may also assign scores to the plurality of autonomous systems based on associated score distributions for the quality of experience metrics.

At step 820, the supervisory service may identify, based in part on the quality of experience metrics, a particular autonomous system from the plurality of autonomous systems associated with a decreased quality of experience for the online application, as described in greater detail above. In some instances, the particular autonomous system may be part of a subset of the plurality that includes autonomous systems that are suspected of negatively affecting the quality of experience metrics for the application.

At step 825, the supervisory service may cause application traffic for the online application to avoid the particular autonomous system. For instance, the service may send an instruction to one or more routers between an endpoint and the online application that causes the router to reroute the traffic along a path that avoids the particular autonomous system. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification of autonomous systems that reduce the quality of application experience of users of a particular online application. Rather than simply relying on predicted violations of SLA templates to drive rerouting decisions, the system introduced herein is able to make more informed decisions, so as to explore other paths that avoid the problematic autonomous system.

While there have been shown and described illustrative embodiments that provide for avoiding autonomous system bottlenecks that can impinge on the quality of experience of an online application, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
obtaining, by a supervisory service for a network, user experience metrics for application sessions of an online application as specified by users of the online application regarding their subjective quality of experiences with the applications sessions of the online application;
mapping, by the supervisory service, the application sessions to paths from an edge router that traverse a plurality of autonomous systems that implement Border Gateway Protocol routing;
identifying, by the supervisory service and based in part on the user experience metrics, a particular autonomous system from the plurality of autonomous systems associated with decreased user experience metrics for the online application;
determining, by the supervisory service, a list of one or more alternative paths from the edge router that avoid the particular autonomous system of the network and any other autonomous systems from the plurality of autonomous systems that are forecasted to cause decreased user experience metrics for the online application; and
causing, by the supervisory service, application traffic for the online application to avoid the particular autonomous system and any other autonomous systems from the plurality of autonomous systems that are forecasted to cause decreased user experience metrics for the online application by providing, to the edge router, the list of one or more alternative paths from the edge router that avoid the particular autonomous system of the network and any other autonomous systems from the plurality of autonomous systems that are forecasted to cause decreased user e metrics for the online application.

2. The method as in claim 1, further comprising:
obtaining, by the supervisory service, path network metrics, wherein the supervisory service identifies the particular autonomous system based further in part on the path network metrics.

3. The method as in claim 1, wherein mapping the application sessions to paths that traverse the plurality of autonomous systems comprises:
generating, by the supervisory service, a graph having nodes that represent the plurality of autonomous systems and edges that represent path segments connecting the plurality of autonomous systems.

4. The method as in claim 3, further comprising:
assigning, by the supervisory service, scores to the plurality of autonomous systems based on associated score distributions for the of user experience metrics.

5. The method as in claim 1, wherein the user experience metrics are specified by users of the online application.

6. The method as in claim 1, further comprising:
detecting a sudden decreased in user experience metrics associated with a path; and
initiating sending of path-trace probes along that path.

7. The method as in claim 1, further comprising:
initiating sending of a Border Gateway Protocol community that indicates the particular autonomous system to one or more downstream autonomous systems.

8. The method as in claim 1, wherein the online application is a software as a service (SaaS) application.

9. The method as in claim 1, wherein identifying the particular autonomous system from the plurality of autonomous systems comprises:
identifying a subset of autonomous systems from the plurality of autonomous systems suspected of decreasing the user experience metrics.

10. An apparatus, comprising:
one or more network interfaces;
a processor coupled to the one or more network interfaces and configured to execute one or more processes; and
a memory configured to store a process that is executable by the processor, the process when executed configured to:
obtain user experience metrics for application sessions of an online application as specified by users of the online application regarding their subjective quality of experiences with the applications sessions of the online application;
map the application sessions to paths from an edge router that traverse a plurality of autonomous systems that implement Border Gateway Protocol routing;
identify, based in part on the user experience metrics, a particular autonomous system from the plurality of autonomous systems associated with a decreased user experience metrics for the online application;
determine a list of one or more alternative paths from the edge router that avoid the particular autonomous system of the network and any other autonomous systems from the plurality of autonomous systems that are forecasted to cause decreased user experience metrics for the online application; and
cause application traffic for the online application to avoid the particular autonomous system and any other autonomous systems from the plurality of autonomous systems that are forecasted to cause decreased user experience metrics for the online application by providing, to the edge router, the list of one or more alternative paths from the edge rooter that avoid the particular autonomous system of the network and any other autonomous systems from the plurality of autonomous systems that are forecasted to cause decreased user experience metrics for the online application.

11. The apparatus as in claim 10, wherein the process when executed is further configured to:
obtain path network metrics, wherein the apparatus identifies the particular autonomous system based further in part on the path network metrics.

12. The apparatus as in claim 10, wherein the apparatus maps the application sessions to paths that traverse the plurality of autonomous systems by:
generating a graph having nodes that represent the plurality of autonomous systems and edges that represent path segments connecting the plurality of autonomous systems.

13. The apparatus as in claim 12, wherein the process when executed is further configured to:
assign scores to the plurality of autonomous systems based on associated score distributions for the user experience metrics.

14. The apparatus as in claim 10, wherein the user experience metrics are specified by users of the online application.

15. The apparatus as in claim 10, wherein the process when executed is further configured to:
detect a sudden decreased in user experience metrics associated with a path; and
initiate sending of path-trace probes along that path.

16. The apparatus as in claim 10, wherein the process when executed is further configured to:
initiate sending of a Border Gateway Protocol community that indicates the particular autonomous system to one or more downstream autonomous systems.

17. The apparatus as in claim 10, wherein the apparatus identifies the particular autonomous system from the plurality of autonomous systems by:
identifying a subset of autonomous systems from the plurality of autonomous systems suspected of decreasing the user experience metrics.

18. A tangible, non-transitory, computer-readable medium storing program instructions that cause a supervisory service for a network to execute a process comprising:
obtaining, by the supervisory service, user experience metrics for application sessions of an online application as specified by users of the online application regarding their subjective quality of experiences with the applications sessions of the online application;
mapping, by the supervisory service, the application sessions to paths from an edge router that traverse a plurality of autonomous systems that implement Border Gateway Protocol routing;
identifying, by the supervisory service and based in part on the user experience metrics, a particular autonomous system from the plurality of autonomous systems associated with decreased user experience metrics for the online application;
determining, by the supervisory service, a list of one or more alternative paths from the edge router that avoid the particular autonomous system of the network and any other autonomous systems from the plurality of autonomous systems that are forecasted to cause a decreased user experience metrics for the online application; and
causing, by the supervisory service, application traffic for the online application to avoid the particular autonomous system and any other autonomous systems from the plurality of autonomous systems that are forecasted to cause decreased user experience metrics for the online application by providing, to the edge router, the list of one or more alternative paths from the edge router that avoid the particular autonomous system of the network and any other autonomous systems from the plurality of autonomous systems that are forecasted to cause decreased user experience metrics for the online application.

* * * * *

UNITED STATES PATENT AND TRADEMARK OFFICE
CERTIFICATE OF CORRECTION

PATENT NO. : 12,231,312 B2
APPLICATION NO. : 17/328205
DATED : February 18, 2025
INVENTOR(S) : Jean-Philippe Vasseur et al.

Page 1 of 1

It is certified that error appears in the above-identified patent and that said Letters Patent is hereby corrected as shown below:

In the Specification

Column 12, Line 9 please amend as shown:
For instance. FIG. 6 illustrates an example of a path graph Column 12, Line 32 please amend as shown:
In other embodiments, PB 504 may map user-specified Column 12, Line 43 please amend as shown:
graph interconnect the autonomous systems, edge router(s), Column 13, Line 54 please amend as shown:
hotspot avoidance routing engine (HARE) 508, which is Column 14, Line 11 please amend as shown:
route for the application. In turn, HARE 508 may cause the Column 14, Line 14 please amend as shown:
For instance, HARE 508 may indicate the path to be used to Column 16, Line 44 please amend as shown:
to cause decreased user experience metrics for the online appli- Column 17 Line 44 please amend as shown:
alternative paths from the edge router that avoid the Signed and Sealed this
Twentieth Day of May, 2025

Coke Morgan Stewart
*Acting Director of the United States Patent and Trademark Office*